(12) United States Patent
Kesarwani

(10) Patent No.: US 9,774,557 B2
(45) Date of Patent: Sep. 26, 2017

(54) METHOD FOR AUTOMATED UPDATING STATUS RELATED DATA ON SOCIAL NETWORKING PLATFORM

(71) Applicant: Gyan Prakash Kesarwani, Nagpur (IN)

(72) Inventor: Gyan Prakash Kesarwani, Nagpur (IN)

( * ) Notice: Subject to any disclaimer, the term of this patent is extended or adjusted under 35 U.S.C. 154(b) by 200 days.

(21) Appl. No.: 14/784,628

(22) PCT Filed: Apr. 16, 2014

(86) PCT No.: PCT/IN2014/000242
§ 371 (c)(1),
(2) Date: Oct. 15, 2015

(87) PCT Pub. No.: WO2014/178073
PCT Pub. Date: Nov. 6, 2014

(65) Prior Publication Data
US 2016/0080306 A1 Mar. 17, 2016

(30) Foreign Application Priority Data
Apr. 17, 2013 (IN) .......................... 1436/MUM/2013

(51) Int. Cl.
*H04L 12/58* (2006.01)
*G06Q 10/00* (2012.01)
(Continued)

(52) U.S. Cl.
CPC ............ *H04L 51/32* (2013.01); *G06F 3/0481* (2013.01); *G06F 3/0483* (2013.01);
(Continued)

(58) Field of Classification Search
None
See application file for complete search history.

(56) References Cited

U.S. PATENT DOCUMENTS

| 8,448,072 B1* | 5/2013 | Lai .................. G06Q 50/01 715/748 |
| 2010/0325194 A1 | 12/2010 | Williamson et al. |
| 2012/0124176 A1* | 5/2012 | Curtis .................. G06Q 50/01 709/219 |
| 2012/0149345 A1* | 6/2012 | Jotanovic .............. H04W 4/003 455/414.1 |
| 2012/0264446 A1* | 10/2012 | Xie .................. G01C 22/00 455/456.1 |
| 2014/0161322 A1* | 6/2014 | Cheng .................. A63B 24/00 382/107 |
| 2014/0180983 A1* | 6/2014 | Deng .................. G06N 3/02 706/15 |

(Continued)

FOREIGN PATENT DOCUMENTS

| CN | 101640839 A | 2/2010 |
| CN | 102461130 A | 5/2012 |
| WO | WO2012072862 A1 | 6/2012 |

*Primary Examiner* — Kenny Lin

(57) ABSTRACT

The various embodiments herein disclose a method for sharing a status update automatically over a social networking platform. The method comprises storing a registered user's schedule over a timeline of the social networking platform and seeking permission for tracking a registered user's personal devices. The schedule is modified and saved by the registered user manually. The method further comprises tracking a user activity through a combination of plurality of components installed in the personal devices. The tracking is done in an online as well as an offline mode. The method further comprises analyzing a variation in the user activity and testing a priority of variation in the user activity. The method further comprises sending suggestion to user to attach or post the user activity over the social networking platform and uploading and posting the user activity over the timeline as well as a homepage of the respective user's profile.

5 Claims, 2 Drawing Sheets

(51) Int. Cl.
*G06Q 50/00* (2012.01)
*H04L 29/08* (2006.01)
*G06F 3/0481* (2013.01)
*G06F 3/0483* (2013.01)
*G06F 3/0485* (2013.01)
*G06F 17/24* (2006.01)
*G06F 17/27* (2006.01)
*H04L 29/06* (2006.01)
*H04N 7/15* (2006.01)
*H04W 4/02* (2009.01)

(52) U.S. Cl.
CPC ........ *G06F 3/0485* (2013.01); *G06F 3/04812* (2013.01); *G06F 17/24* (2013.01); *G06F 17/2705* (2013.01); *G06Q 10/00* (2013.01); *G06Q 50/01* (2013.01); *H04L 65/601* (2013.01); *H04L 67/02* (2013.01); *H04L 67/18* (2013.01); *H04L 67/22* (2013.01); *H04L 67/306* (2013.01); *H04N 7/155* (2013.01); *H04W 4/02* (2013.01)

(56) References Cited

U.S. PATENT DOCUMENTS

2014/0279495 A1* 9/2014 Rusev .................... G06Q 50/01
                                                                          705/44
2015/0120873 A1   4/2015 Williamson et al.

* cited by examiner

METHOD FOR AUTOMATED UPDATING STATUS RELATED DATA ON SOCIAL NETWORKING PLATFORM

BACKGROUND

Technical Field of Invention

The present invention generally relates to an online method for data management and particularly relates to an online method for updating status of a user, modifying the data and setting an automated periodic reminder.

Description of Related Art

A social network is a social structure made up of a set of actors (such as individuals or organizations) and the dyadic ties between these actors. The social network perspective provides a clear way of analyzing the structure of whole social entities. The study of these structures uses social network analysis to identify local and global patterns, locate influential entities, and examine network dynamics.

One of the prior arts discloses a software-as-a-service ("SaaS") digital document management system ("DDMS"). The DDMS is located remotely from an office building or other place of business on a remote server. The server is connected to one or more databases for storing digital documents or information extracted from the digital documents. A user populates the DDMS by sending digital documents to the server using a computer, an email-enabled scanner, or the like. When a digital document is received at the server, the document is routed to a customer pending queue, information from the digital document is extracted, the digital document is stored in a directory, and the extracted information is stored in a relational database. The extracted information is supplemented or corrected as necessary using a web portal which allows a user to access the digital document and the extracted information. The digital document and the extracted information are then sent to a first destination such as an archive or mail-on-demand (e.g., a mail and print service).

Another prior art discloses a document management system includes a content repository for storing a file, a management system for monitoring and managing the file in the content repository, and an authoring portal. The authoring portal embeds ActiveX controls in a document, parses the document, and converts the document into an HTML file. The authoring portal further generates JavaScript codes, thereby enabling the content repository to dynamically respond the input of a user and provide the user with feedback without accessing a database associated with the document. The codes also enable the content repository to dynamically adjust the sequence in which the documents are presented to the user in response to the inputs from the user.

Although the prior arts provides a manual editing of documents especially a text or an image data. Further the prior arts fail to track a user activity virtually in an online as well as offline mode and update a status on the basis of the same. The prior arts also fail to suggest a plurality of status data and upload it automatically over a social networking platform.

In the view of foregoing, there is a need for a method to automatically track a user activity using a plurality of online and offline measures. Also there is a need for a method to send suggestion on the basis of user activities and automatically upload the suggested data over a social networking platform after user authorization. Further there is a need for a method to send daily reminders with priority notifications and update an online status as per reminders and its counteractions taken by the user.

The above mentioned shortcomings, disadvantages and problems are addressed herein, as detailed below.

OBJECTS OF THE INVENTION

The primary objective herein is to provide a method to automatically track a user activity using a plurality of online and offline measures.

Another object herein is to provide a method to send suggestion on the basis of user activities and automatically upload the suggested data after user authorization.

Yet another object herein is to provide a method to send daily reminders with priority notifications and update an online status as per reminders and its counteractions taken by the user.

These and other objects and advantages of the embodiments herein will become readily apparent from the following detailed description taken in conjunction with the accompanying drawings.

SUMMARY OF THE INVENTION

The various embodiments herein disclose a method for sharing a status update automatically over a social networking platform. The method comprises storing a registered user's schedule over a timeline of the social networking platform and seeking permission for tracking a registered user's personal devices. The personal devices comprise a mobile phone, a tablet, a phablet, a Personal Computer and a laptop. The schedule is modified and saved by the registered user manually. The method further comprises tracking a user activity through a combination of plurality of components installed in the personal devices. The tracking is done in an online as well as an offline mode. The method further comprises analyzing a variation in the user activity and testing a priority of variation in the user activity. A significant user activity is selected on the basis of testing. The method further comprises sending suggestion to user to attach or post the user activity over the social networking platform and uploading and posting the user activity over the timeline as well as a homepage of the respective user's profile.

According an embodiment herein, the plurality of components comprises a Global Positioning System (GPS) component, a Near-Field Communication component, a primary and secondary camera, a mobile payment application and a chat application.

According an embodiment herein, the significant user activity comprises an image capturing, a video recording, a trip outing, a presence in a new geographical location and a shopping.

According an embodiment herein, the method implements a data resolving computer readable application or program (DRA). The DRA scrutinizes a captured image, audio or video and send the captured data to a central server of the social networking platform as a packet data through a cellular communication. The central server sends the request to the user to post the data over the homepage of the user's profile.

According an embodiment herein, the DRA analyzes a voice input in response to a captured image, audio or video and runs following steps:
  a) Test an audio expression;
  b) Detect a high pitch voice expression for a minimum interval of 5 seconds;
  c) Save the captured data with high pitch voice expression over a local memory of the personal devices;

d) Send the saved data to the central server;
e) Transmit a request for uploading and posting the saved data to a user's registered personal device;
f) Check:
   If "user accepts" then "post data";
   Otherwise "save data on central server";
g) Display posted data on the homepage of the user's profile.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE DRAWINGS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
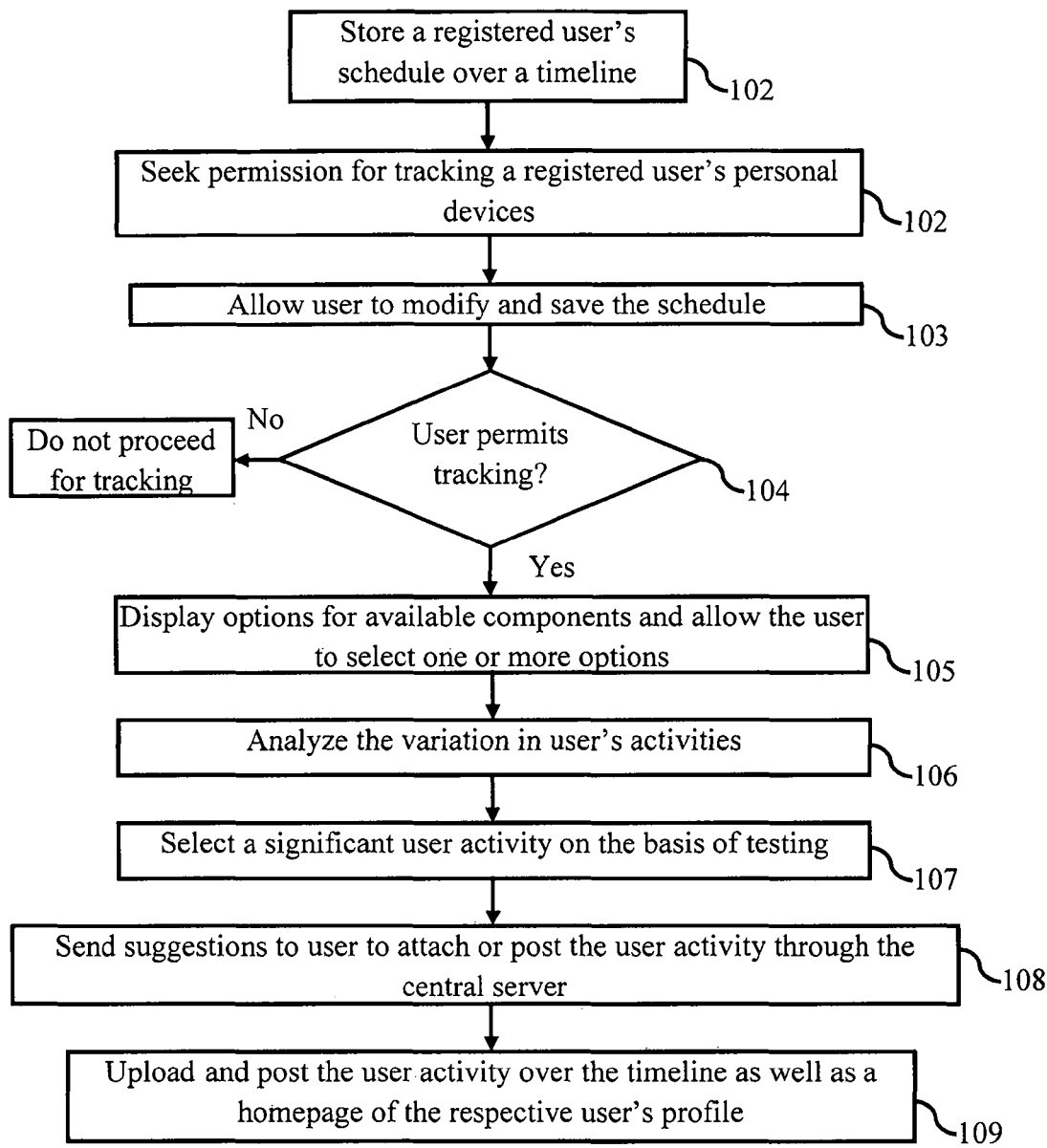
FIG. 1 illustrates a flowchart for a method for sharing a status update automatically over a social networking platform, according to an embodiment herein.

FIG. 1 illustrates a flowchart for a method for sharing a status update automatically over a social networking platform, according to an embodiment herein. With respect to FIG. 1, the method comprises storing a registered user's schedule over a timeline of the social networking platform (101) and seeking permission for tracking a registered user's personal devices (102). The personal devices comprise a mobile phone, a tablet, a phablet, a Personal Computer and a laptop. The schedule is modified and saved by the registered user manually (103). The user's personal device displays options for available components and allows the user to select one or more options (105) if the user grants permission for tracking (104). The method turns off any tracking option if user rejects the request for tracking. The user activities are tracked through a combination of plurality of components installed in the personal devices. The tracking is done in an online mode through IP tracking and updates on chat application. The location of the local IP address of the user's personal device is tracked as soon as an internet communication is established. Also the data shared on the chat application (installed over the user's personal device) is fed into the central server periodically. The online mode tracking assists in updating a location, a latest image, a latest audio or a latest video of the user or recorded by the user. The tracking is further done in an offline mode through the GPS tracking, the NFC tapping and the mobile payment. The offline mode tracking allows in updating a location of user over the social networking platform. The variations in the user activities are analyzed (106) and a priority of variation in the user activity is tested. A significant user activity is selected on the basis of testing (107). The method further comprises sending suggestion to user to attach or post the user activity over the social networking platform (108) and uploading and posting the user activity over the timeline as well as a homepage of the respective user's profile (109).

Figure 2:
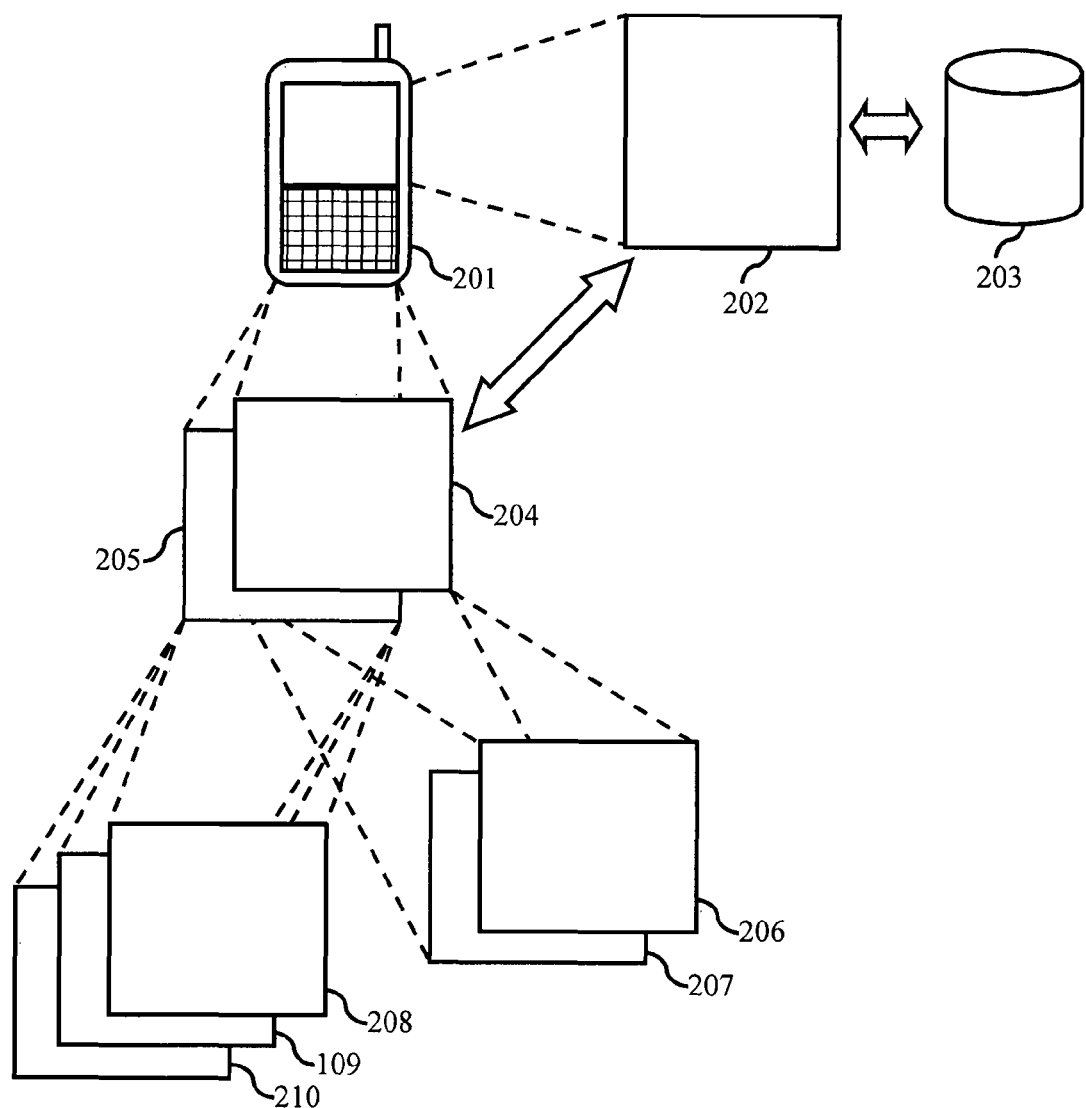
FIG. 2 illustrates a block diagram for layered communication of personal devices with the central server during a sharing a status update automatically over a social networking platform, according to an embodiment herein.

FIG. 2 illustrates a block diagram for layered communication of personal devices with the central server during a sharing a status update automatically over a social networking platform, according to an embodiment herein. With respect to FIG. 2, a plurality of components in user's personal devices 201 is connected to the central server 203 via the DRA 202. The component functions in hierarchical manner allowing online mode tracking 204 followed by offline mode tracking 205. The online mode tracking 204 also functions in a hierarchical manner allowing a chat application tracking 206 followed by an IP tracking 207. After collecting the data through the online mode tracking 204, the central server 203 activates the offline mode tracking 205. The offline mode tracking 205 also function in a hierarchical manner allowing a GPS tracking 208 followed by a NFC tracking 209 and then a mobile payment tracking 210. If one level of tracking fails in the online mode 204 or the offline mode 205 then another level of tracking is attempted within the same mode. This is known as an intra-mode tracking. Further if the online mode 204 tracking fails then the central server 203 attempts the offline mode 205 tracking known as inter-mode tracking.

According to an embodiment herein, the central server performs a plurality of modification and enhancement tools to provide various perspectives of the captured data automatically. After creating a plurality of modification in the captured data with diverse effects, the central server sends the request to user to select one of the modified versions or original version.

According to an embodiment herein, the personal device reminds the user for a work as per a reminder set on a calendar provided in the social networking platform. The calendar allow a user to set the details of the work like estimated time for completion of work, landmarks within the work to be achieved and their timeline, a leisure period within the work etc. The social networking platform updates the fulfilment of the reminders and landmarks and sends an analysis of the same to the user. The social networking platform also allows maps a leisure period of two users belonging to a common social group over the social networking platform and sends notification to both, for arranging a call or chat. On receiving a permission from both the user, the social networking platform send the reminder to both the users at the beginning of the leisure period and start the call or chat.

According to an exemplary embodiment, the user visits a shopping mall and snaps a picture of a scenic view there. The location of user is tracked in either online or offline mode. After confirmation of the location and its significance (acknowledge through tracking), the personal device pops a request to post a statement that "User is in the shopping mall XYZ". Also after detecting a fresh captured image, the personal device starts searching for internet availability. The personal device pops a request as soon as internet service available to post the captured image over a profile status of user. After receiving confirmation from the user, the personal device uploads the image and status over the user's profile as well as save it on the timeline of the user with time and date stamp.

The present invention automates the status updating over the social networking platform allowing a time saving as the user uses a lot of tools to modify and update a data over the profile status. The present invention also verifies a user activity in a location that automatically enhances an emergence tracing of the user.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims presented in the complete specification or non-provisional application.

I claim:

1. A method for sharing a status update automatically over a social networking platform:

storing a registered user's schedule over a timeline of the social networking platform, wherein the schedule is modified and saved by the registered user manually;

seeking permission for tracking a registered user's personal devices, wherein the personal devices comprises a mobile phone, a tablet, a phablet, a Personal Computer and a laptop;

tracking a user activity through a combination of plurality of components installed in the personal devices, wherein the tracking is done in an online as well as an offline mode;

analyzing a variation in the user activity;

testing a priority of variation in the user activity, wherein a significant user activity is selected on the basis of testing;

sending suggestion to user to attach or post the user activity over the social networking platform;

uploading and posting the user activity over the timeline as well as a homepage of the respective user's profile.

2. The method as claimed in claim 1, wherein the plurality of components comprises a Global Positioning System (GPS) tracker, a Near-Field Communication component, a primary and secondary camera, a mobile payment application and a chat application.

3. The method as claimed in claim 1, wherein the significant user activity comprises an image capturing, a video recording, a trip outing, a presence in a new geographical location and a shopping.

4. The method as claimed in claim 1 implements a data resolving computer readable application or program (DRA), wherein the DRA scrutinizes a captured image, audio or video and send the captured data to a central server of social networking platform as a packet data through a cellular communication, wherein the central server sends the request to the user to post the data over the homepage of the user's profile.

5. The method as claimed in claim 1, wherein the DRA analyzes a voice input over a captured image, audio or video and runs following steps:
 a) Test an audio expression;
 b) Detect a high pitch voice expression for a minimum interval of 5 seconds;
 c) Save the captured data with high pitch voice expression over a local memory of the personal devices;
 d) Send the saved data to the central server;
 e) Transmit a request for uploading and posting the saved data to a user's registered personal device;
 f) Check:
   If "user accepts" then "post data";
   Otherwise "save data on central server";
 g) Display posted data on the homepage of the user's profile.

* * * * *